United States Patent
Stevens

(10) Patent No.: US 6,460,794 B1
(45) Date of Patent: Oct. 8, 2002

(54) PRETENSIONER DRIVE

(75) Inventor: Bruce A. Stevens, Oakland Township, MI (US)

(73) Assignee: Automotive Systems Laboratory, Inc., Farmington Hills, MI (US)

( * ) Notice: Subject to any disclaimer, the term of this patent is extended or adjusted under 35 U.S.C. 154(b) by 0 days.

(21) Appl. No.: 09/871,342

(22) Filed: May 31, 2001

Related U.S. Application Data

(63) Continuation-in-part of application No. 09/777,388, filed on Feb. 5, 2001.
(60) Provisional application No. 60/208,403, filed on May 31, 2000.

(51) Int. Cl.$^7$ .............................................. B60R 22/46
(52) U.S. Cl. ..................................................... 242/374
(58) Field of Search ....................... 242/374; 280/806; 297/478, 480

(56) References Cited

U.S. PATENT DOCUMENTS

| | | | |
|---|---|---|---|
| 4,750,759 A | 6/1988 | Escaravage ................. 280/806 |
| 4,932,603 A | 6/1990 | Yamanoi et al. | |
| 5,222,994 A | 6/1993 | Hamaue | |
| 5,397,075 A | 3/1995 | Behr ........................... 242/374 |
| 5,482,327 A | * 1/1996 | Schmid ........................ 280/806 |
| 5,588,608 A | 12/1996 | Imai et al. ................... 242/374 |
| 5,641,131 A | 6/1997 | Schmid et al. .............. 242/374 |
| 5,697,571 A | 12/1997 | Dybro et al. ................ 242/374 |
| 5,839,686 A | 11/1998 | Dybro et al. ................ 242/374 |
| 5,853,135 A | 12/1998 | Dybro et al. ................ 242/374 |
| 5,899,399 A | 5/1999 | Brown et al. ................ 242/324 |
| 5,906,328 A | 5/1999 | Hamaue et al. ............. 242/374 |
| 5,944,350 A | 8/1999 | Grabowski et al. ......... 280/806 |
| 5,967,440 A | 10/1999 | Marshall ..................... 242/374 |
| 6,000,655 A | 12/1999 | Coppo ......................... 242/374 |
| 6,036,274 A | 3/2000 | Kohlndorfer et al. ....... 297/480 |
| 6,139,058 A | 10/2000 | Bohmler ..................... 280/806 |

FOREIGN PATENT DOCUMENTS

| | | | | |
|---|---|---|---|---|
| DE | 3220498 A1 | * | 1/1983 | ................. 242/374 |
| DE | 32 31 509 A1 | | 3/1984 | |
| DE | 100 10 379 A1 | | 9/2000 | |

* cited by examiner

Primary Examiner—John M. Jillions
(74) Attorney, Agent, or Firm—Dinnin & Dunn, P.C.

(57) ABSTRACT

A pretensioner 10 for a seat belt 12 utilizes a perforated strap 34 loosely coiled about a hub 38 wherein the hub 38 is, in normal operation of a vehicle, rotatable with a webbing reel shaft 40. A plurality of protrusions 42 are circumferentially spaced about the hub and mesh with the perforated strap 34 upon activation of the pretensioner 10. The pretensioner 10 contains a first passage 44 and a second passage 46 for the respective containment of the hub 38 and an actuator 20, wherein each passage is formed perpendicular and in volumetric intersection with the other. The pretensioner 10 also contains a gas generant composition 22 in combustive communication with the actuator 20. Upon ignition, the gas pressure produced by the pyrotechnic 22 propels the actuator 32 into the strap 34, thereby effecting rotary advancement of the hub 38 and the shaft 40, and thus pretensioning the seat belt 12 wound about a spool 11 of a seat belt retractor 14, wherein the spool 11 is rotatably engaged with a second portion of the shaft 40 and thus provided in coaxial relation with the hub 38.

11 Claims, 3 Drawing Sheets

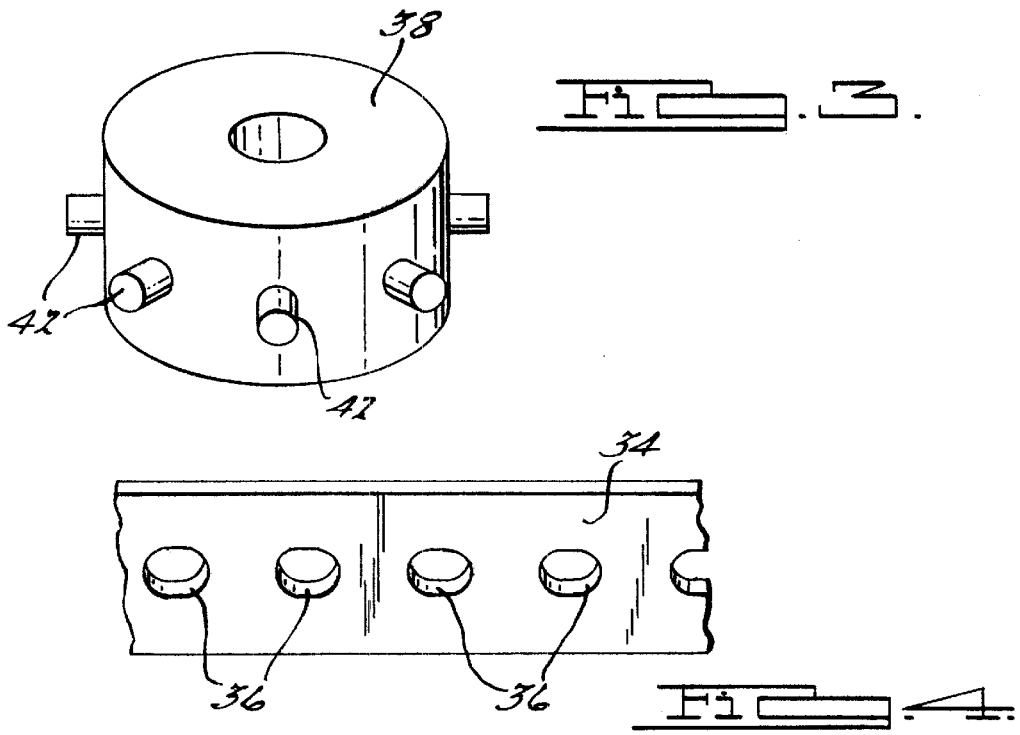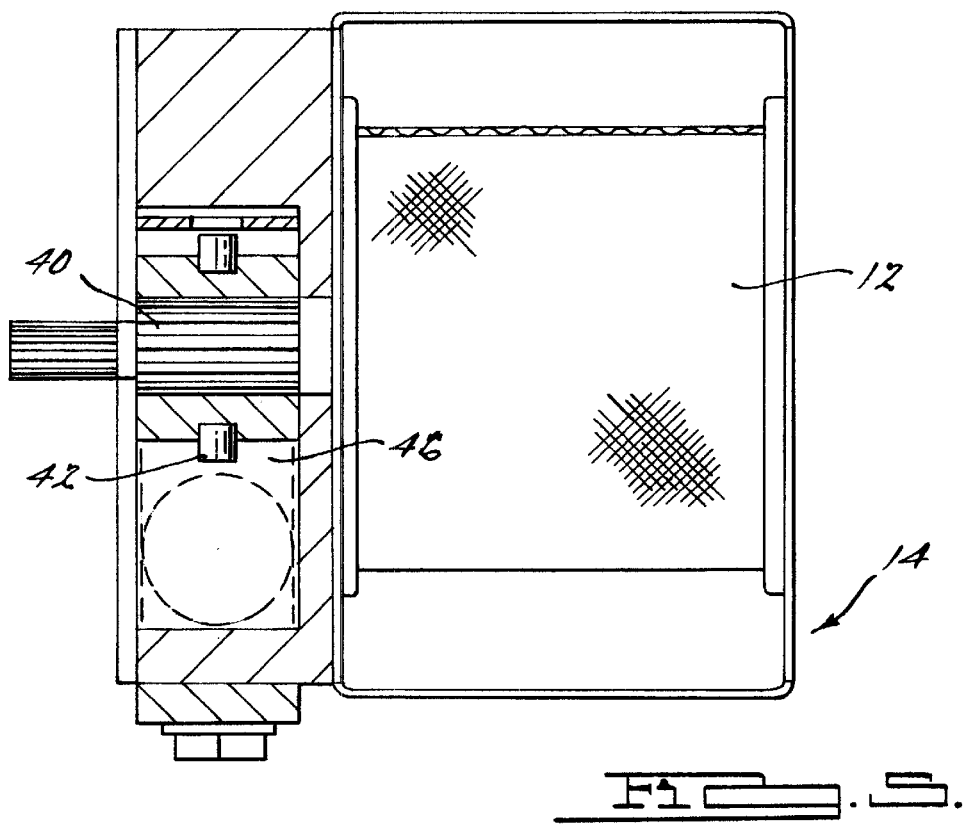

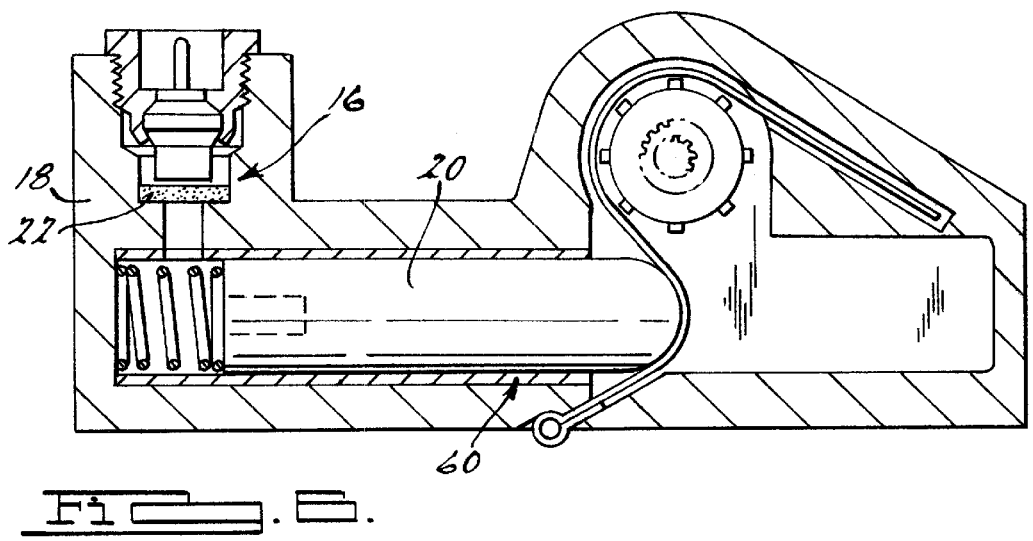
FIG. 6.
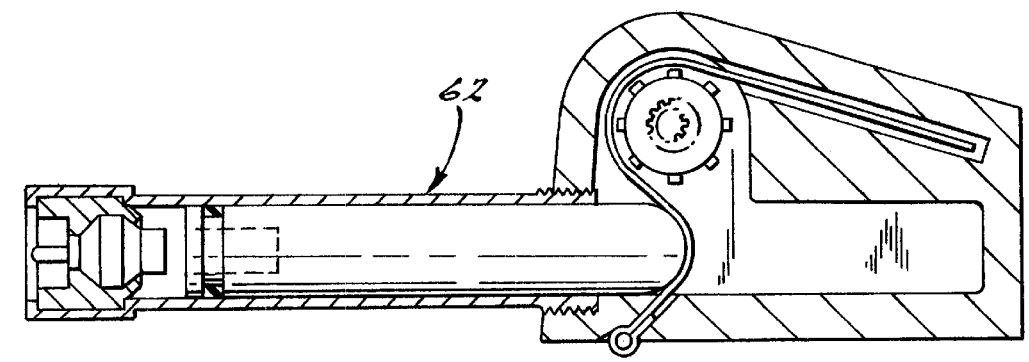
FIG. 7.
FIG. 8.
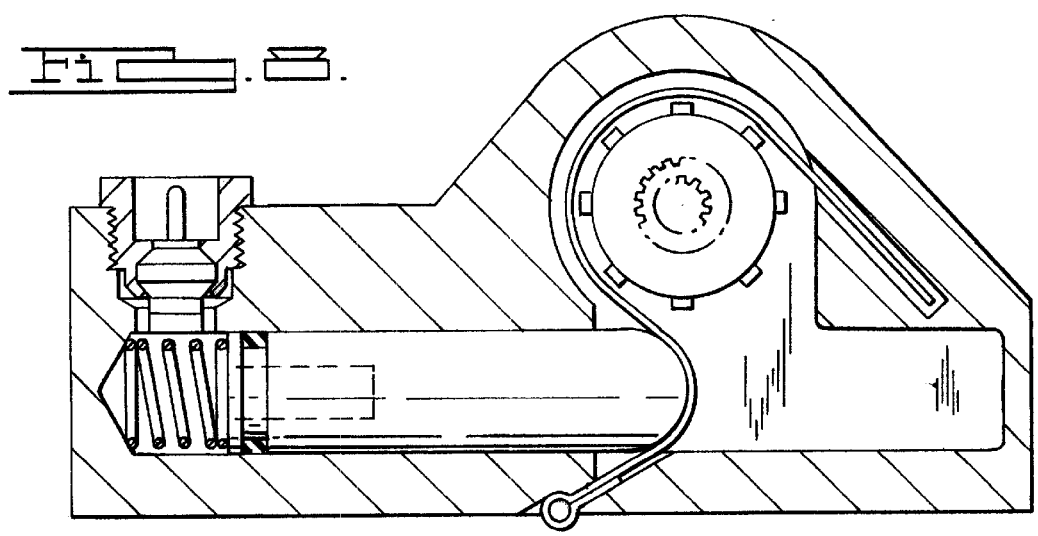

PRETENSIONER DRIVE

CROSS-REFERENCE TO RELATED APPLICATIONS

This application claims the benefit of U.S. Provisional Application Ser. No. 60/208,403 filed on May 31, 2000. This application is also a continuation in part of co-pending U.S. application Ser. No. 09/777,388 filed on Feb. 5, 2001.

BACKGROUND OF THE INVENTION

The present invention relates to seat belt pretensioners and, more specifically, to a seat belt pretensioner that incorporates a motion multiplier thereby reducing the actuator stroke requirement. Furthermore, the present invention provides pretensioner drive mechanisms that substantially simplify the pretensioner design as compared to known designs.

Seat belt pretensioners remove slack from a seat belt in the event of a collision in order to minimize forward movement of the passenger. While it is known to use pyrotechnic gas generators to operate mechanisms which wind up or otherwise pull in slack in the seat belt during a collision, such known pyrotechnic gas generators are generally disposed internally of a seat belt retractor. Thus, the vehicle owner is faced with a significant cost penalty in that the entire pretensioner and retractor assembly must be replaced after activation because of the inability to prevent degradation of the retractor. High-temperature gases tend to abrade interior metal surfaces and produce ash and clinkers that bind up the retraction mechanism.

Another problem with known pretensioners is that they are designed to activate only in severe accidents, for example, accidents that exhibit "G" forces sufficient to activate the vehicle airbags. Safety system designers generally choose such a relatively high activation threshold due to the expense of replacing the entire seat belt retractor and pretensioner assembly after activation. As a result, seat belt pretensioners do not protect passengers in less severe accidents.

A related problem with known pretensioners is that when the pretensioner is activated only in severe accidents, activation is relatively late in the crash sequence. Thus, the pretensioner must rapidly take up slack in the seat belt thereby potentially aggravating the passenger.

U.S. Pat. No. 5,967,440, herein incorporated by reference, describes a pretensioner and a conventional retractor for a safety belt system. When compared to the seatbelt retractor, the pretensioner is relatively complex and large, thus increasing the weight and spatial requirements of the seatbelt assembly.

U.S. Pat. No. 5,899,399, herein incorporated by reference, describes a state of the art pretensioner. The pretensioner is relatively complex and as such complicates the manufacturing process.

U.S. Pat. No. 5,944,350, herein incorporated by reference, describes a state of the art pretensioner. Again, the pretensioner is relatively large, thus increasing the weight and spatial requirements of the seatbelt assembly.

German Patent No. DE 10010379 A1, herein incorporated by reference, describes a pretensioner having an arcuate path for a multi-piece actuator (a plurality of cylinders) that drives a steel cord wrapped around a webbing reel hub and thereby effects pretensioning of an associated seat belt. The manufacturing of the pretensioner is more complex given the multi-piece actuator and given the arcuate channel that the actuator must traverse. Uniformity in channel width and effective sealing becomes more difficult with the use of an arcuate channel. Secondly, a noise reduction means is employed to prevent rattling during normal vehicle operation, thereby increasing manufacturing costs. Furthermore, the joint use of the multi-piece actuator with the steel cord results in a friction loss and a reduction in the load applied to the steel cord by the forward-most cylinder of the actuator. As a result, more force is required to drive the multi-piece actuator and pretension the seatbelt. One solution is described by the use of an intermediate element "43" for facilitating the smooth movement of the rotating elements along the arcuate channel. Consequently, without the use of the intermediate element "43", a more robust pretensioner housing would be necessitated to withstand the relatively greater combustion pressure (produced by a greater amount of propellant) likely necessary to pretension the seatbelt in accordance with customer requirements.

Other pretensioner designs employ relatively complicated clutch assemblies for clutching a seat belt retractor axle associated therewith. Many known pretensioner drive systems are also relatively complex. U.S. Pat. Nos. 6,042,041, 5,842,344, 5,794,876, and 5,699,976, herein incorporated by reference, illustrate the complexity of known pretensioners. Simplification of known designs, therefore, is desirable given a resultant simplification of manufacturing requirements.

SUMMARY OF THE INVENTION

The aforesaid concerns are resolved, in accordance with a preferred constructed embodiment of the present invention, by a seat belt pretensioner that utilizes a motion multiplier within an essentially sealed housing thereby preventing retractor exposure to combustion gases and clinkers. The present design also prevents occupant exposure to the gases and solids formed upon combustion of a pyrotechnic composition contained within the pretensioner.

In a preferred embodiment of the invention, the pretensioner contains a housing, an annular hub having spaced circumferential protrusions integral thereto, a retractor shaft axially disposed within the annular hub thereby providing mechanical cooperation between the pretensioner and a seat belt retractor, a perforated strap having a plurality of apertures wherein each aperture at least corresponds to a respective protrusion of the hub, a piston that communicates with the strap upon pretensioner activation, a gas generant or pyrotechnic that upon combustion propels the piston, and an initiator that ignites the gas generant upon a signal from an accelerometer, for example. Upon ignition of the gas producing pyrotechnic, the piston is driven forward in an essentially linear path thereby tightening the strap about the hub as the perforations mesh with the hub protrusions. The seat belt spooled about a second end of the retractor shaft within the seat belt retractor is thus pretensioned.

BRIEF DESCRIPTION OF THE DRAWINGS

FIG. 3 is a perspective view of the hub having a plurality of circumferential protrusions integral thereto.

FIG. 4 is an elevational view of the perforated strap having a plurality of perforations.

FIG. 5 is an elevational view of a pretensioner of the present invention in cooperation with a state-of-the-art seat belt retractor.

FIG. 6 is another embodiment of the present invention wherein a resilient liner is utilized to strengthen a second passage within the housing and a gas generator is also employed.

FIG. 7 is yet another embodiment of the present invention wherein a resilient sleeve exterior of the housing is fixed to the second passage within the housing, in axial alignment therewith.

FIG. 8 is yet another embodiment of the present invention.

DESCRIPTION OF THE PREFERRED EMBODIMENT

Figure 1:
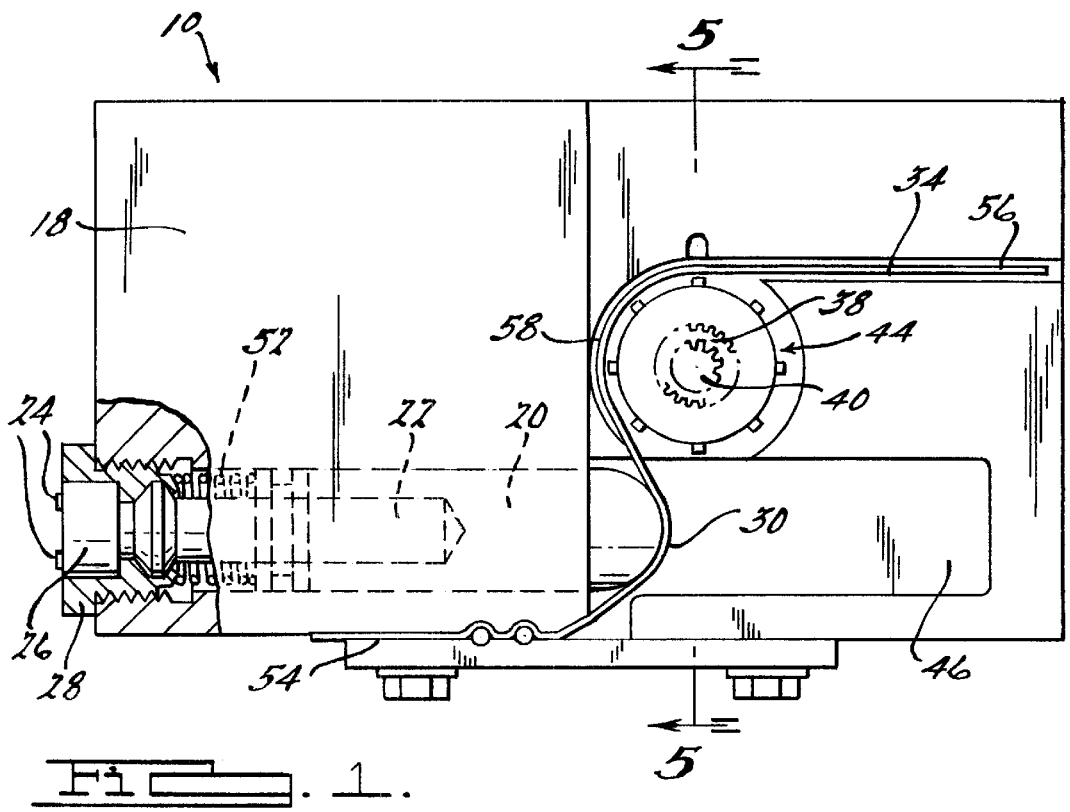
FIG. 1 is a diagrammatic elevational view of a replaceable seat belt pretensioner in a pre-activated condition, in accordance with the present invention.
Figure 2:
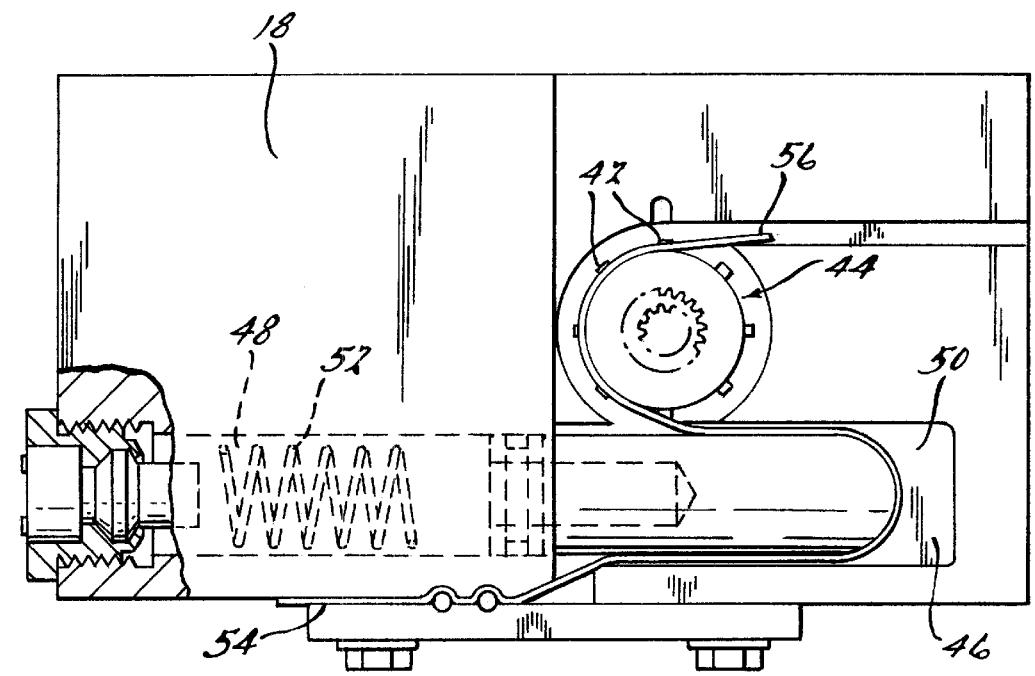
FIG. 2 is a second diagrammatic elevational view of the present invention illustrating activation of the pretensioner.

Referring to the figures, a pretensioner 10 in accordance with a preferred embodiment of the invention, comprises a gas generator 16 adapted to pretension a seat belt 12 of a conventional seat belt retractor 14. Exemplary seat belt retractors wherein the pretensioner of the present invention has potential application are described in U.S. Pat. Nos. 4,558,832 and 4,597,546, herein incorporated by reference. In general, a pretensioner 10 in accordance with the present invention may if desired replace many pretensioners now employed in the art.

A housing 18 contains the gas generator 16. Upon pretensioner activation, the gas generator 16 fluidly communicates with a piston 20. The piston 20 is made from steel, brass, aluminum, plastic, or other sufficiently rigid material. The gas generator 16 contains a pyrotechnic material 22 used to actuate the pretensioner 10. The gas generant 22 may comprise any known or state of the art propellant now used in pretensioners, or alternatively, it may comprise any known gas generant useful in airbags for example. To illustrate, see U.S. Pat. No. 5,035,757 herein incorporated by reference. Alternatively, the gas generant 22 may be housed within the piston 20 wherein the piston also functions as a gas generator thereby eliminating the need for a separate generator 16.

Electrical contacts 24 on an initiator 26 communicate with any known crash event sensor (not shown) that signals actuation of the pretensioner 10. The initiator 26 is housed within an initiator retainer 28. Once the initiator 26 receives a signal, from an accelerometer for example, the initiator 26 ignites the pyrotechnic gas generant 22. Stated another way, a means for activating the pretensioner 10 and driving the actuator 20 includes the gas generant 22 contained within the piston 20 (or provided in a separate gas generator 16), the electrical contacts 24, and the initiator 26.

Gas produced from combustion of the pyrotechnic gas generant 22 then propels the piston 20 into a flat portion 30 of a strap 34. A plurality of apertures or perforations 36 are evenly or otherwise spaced along the length of the strap 34. The strap 34 is loosely arranged around a portion of the circumference of a hub 38. Hub 38 is press-fitted or otherwise fixed to a retractor axle 40 and therefore rotatably communicates with the retractor axle 40. As shown in FIG. 1, hub 38 freely rotates with the retractor axle 40 prior to pretensioner 10 activation. Hub 38 contains a plurality of knobs or protrusions 42 evenly or otherwise spaced about the circumference of hub 38 wherein each knob in the plurality 42 preferably corresponds to at least one aperture in the plurality 36. The distance from one respective perforation to another respective perforation in the strap 34 is roughly equivalent to the arcuate distance from one corresponding protrusion to another about the hub 38. As shown in FIG. 4, the diameter of the perforations 36 is sized to be at least slightly larger than the diameter of the protrusions 42. Alternatively, the perforations 36 may be elliptically shaped or otherwise shaped to accommodate the smaller sized protrusions 42. In essence, the perforations 36 are sized to facilitate rapid engagement and meshing with the protrusions 42 once the pretensioner 10 is activated.

In accordance with one aspect of the invention, a first cylindrical channel 44 contains the hub 18. A second rectangular channel 46 has a first end 48 and a second end 50, and is formed in perpendicular orientation and in volumetric intersection with the first channel 44. The actuator 20 is housed in the first end 48, prior to ignition of the propellant 22 and activation of the pretensioner 10. A spring 52 may be used to bias the actuator 20 against the flat portion 30 of the strap 34 that crosses the channel 46. Noise due to vibration is thereby inhibited. Strap 34 has a free first end 56 that extends from a second flat portion 58 of the strap 34 that is oriented about the circumference of the hub 38. A second end 54 of the strap 34 is secured to the housing 18 at a point adjacent to the piston 20. When arranged in this manner, the strap 34 provides a multiplier effect similar to that afforded by the use of gearing style motion multipliers, but at a much lower cost.

Upon activation of the pretensioner 10 and combustion of the propellant 22, the piston 20 is propelled into the strap 34 wherein the strap 34 then grips and tightens around the hub 38. Or, upon combustion of the propellant 22 and upon rotation of the hub 38, the plurality of knobs 42 are forcibly seated into respective apertures within the plurality of apertures 36. The forward linear motion of the piston 20 thus results in a rotary movement of the hub 38 and the retractor axle 40, thereby tightening the belt 12. The present invention, however, simplifies the design and manufacturing of known motion multipliers and yet retains the multiplier advantage of reducing the strap 34 or piston 20 stroke requirement. Additionally, the essentially sealed housing 18 prevents the release of large quantities of gas, noise, and flame.

Stated another way, the pretensioner 10 for the seat belt 12 utilizes a perforated strap 34 loosely coiled about the hub 38 wherein the hub 38 is, in normal operation of a vehicle, rotatable with a webbing reel shaft 40 independent of strap 34. A plurality of protrusions 42 are circumferentially spaced about the hub and mesh with the perforated strap 34 upon activation of the pretensioner 10. The pretensioner 10 contains a first passage 44 and a second passage 46 for the respective containment of the hub 38 and an actuator 20, wherein each passage is formed perpendicular and in volumetric intersection with the other. The pretensioner 10 also contains a gas generant composition 22 in combustive communication with the actuator 20. Upon ignition, the gas pressure produced by the pyrotechnic 22 propels the actuator 32 into the strap 34, thereby effecting rotary advancement of the hub 38 and the shaft 40, and thus pretensioning the seat belt 12 wound about a spool 11 of a seat belt retractor 14, wherein the spool or webbing reel 11 is rotatably engaged with a second portion of the shaft 40 and thus provided in coaxial relation with the hub 38.

In one aspect of the invention as shown in FIG. 6, a hard and resilient liner 60, steel for example, may if desired be press fitted within the first end 48 to conform to the inner surface of the passage 46, wherein the liner 60 extends up to the circumference of the first cylindrical passage 44, but not in intersecting relationship with the diameter of passage 44. Liner 60 thus enhances the strength of the combustion or pressure chamber 48 (first end 48) therefore permitting the use of lower strength materials for the housing 18 such as aluminum or certain plastics. Material costs may thereby be reduced.

In another embodiment shown in FIG. 7, a steel sleeve 62 may alternatively be threadedly received or otherwise fixed to an opening in the exterior of housing 18 in axial alignment with passage 46. The initiator 26 may be threadedly received or otherwise fixed to an opposite end of the sleeve 62. The propellant 22 and the actuator 20 are then sequentially positioned within the sleeve 62 between the initiator 26 and the housing 18. At the second end of the sleeve 62, the strap portion 30 and the leading edge of the actuator would again be in flush communication prior to activation of the pretensioner 10. In contrast to the embodiment shown in FIG. 6, the use of the sleeve 62 outside of the second rectangular passage 46 permits a reduction in the size of the housing 18 and therefore a reduction in materials and weight.

As also shown in FIG. 6, a pretensioner 10 of the present invention may also utilize an initiator 26 in ignitable communication with a propellant 22 within a gas generator 16, each contained within a third chamber. The third chamber preferably runs parallel to the first cylindrical chamber 44, and perpendicular to the rectangular chamber 46. Gas produced from the gas generator 16 is forced into the second passage 46, thus driving the actuator 20 forward.

FIG. 8 illustrates a compact embodiment of the present invention.

To illustrate a retractor response based on pretensioner operation, see U.S. Pat. No. 5,899,399 to Brown et al., herein incorporated by reference. "Pretensioning" is generally defined to mean to take up slack in the seat belt. In accordance with the present invention, the gas produced by the gas generant propels the piston 20 into the strap 34 and thus affects rotary advancement of the hub 38 thereby tightening the slack in the seat belt 12.

After activation of the pretensioner 10, only the pretensioner 10 or parts therein need be replaced. The seat belt retractor is generally salvageable.

The housing 18, the piston 20, the hub 38, and the initiator retainer 26 are preferably injection-molded, die cast and/or machined from plastics, composites, and/or one or more metals such as steel, a steel alloy, zinc, or aluminum. The gas generator 16, the gas generant 22, the initiator 26 and the strap 34 are all manufactured or obtained by methods known to those of ordinary skill. Strap 34, for example, may be cut from sheet metal and then stamped or punched to provide the plurality of apertures 36. Companies such as Takata, Inc. of Japan, for example, may supply the gas generator 16. The initiator 22 may be supplied by the original equipment manufacturer or from companies such as Special Devices Incorporated. The aforementioned references are incorporated by reference and cited by way of example.

Resultant benefits include simplified manufacturing and retractor preservation. For example, see U.S. Pat. No. 5,899, 399 to Brown et al. Also see U.S. Pat. No. 5,397,075 to Behr, herein incorporated by reference, wherein complicated gear driving mechanisms used to actuate the retractor axle can be replaced by the present invention.

Because expense heretofore associated with activation of a pretensioner is significantly reduced, passengers can be assured of the protection of seat belt pretensioning in even minor accidents. Moreover, a pretensioner that activates in minor collisions will also activate earlier in a severe crash sequence. Earlier activation of the pretensioner facilitates a less aggressive onset of initial pretensioner operation, thereby reducing the possibility of injury caused by the seat belt pretensioner.

Finally, gas ventilation ports as required in certain pretensioners are not required and therefore manufacturing is even further simplified.

While the foregoing illustrates and describes the use of the present invention, it is not intended to limit the invention as disclosed in certain preferred embodiments herein. Therefore, variations and modifications commensurate with the above teachings and the skill and/or knowledge of the relevant art, are within the scope of the present invention as described herein and as stated in the appended claims.

I claim:

1. A pretensioner cooperating with a webbing reel shaft of a seatbelt retractor webbing reel, that upon activation pretensions seatbelt webbing associated therewith, the pretensioner comprising:

a housing having a first circular cylindrical passage volumetrically intersecting a second rectangular cylindrical passage, said passages formed perpendicular to each other, wherein said webbing reel shaft extends through said first passage and said second passage has a first end and a second end, the second passage extending across and past the diameter of the first passage;

a cylindrical hub fixed to said webbing reel shaft and contained within the first passage wherein said webbing reel shaft axially extends through said hub;

a plurality of protrusions integral to and circumferentially spaced about said hub;

a perforated strap comprising a first end fixed to said housing, a flat portion extending from said first end and across said second passage, a second flat portion arranged about a portion of said hub, and a second end freely extending from said second flat portion such that the hub rotates independently of said strap prior to pretensioner activation;

an actuator positioned within the first end of said second passage for tensioning said strap upon pretensioner activation;

a gas generant composition, ignitable to activate the pretensioner and release sufficient force to drive the actuator through said second passage; and an initiator within said housing and ignitably communicating with said gas generant composition for igniting said gas generant composition, whereby upon ignition of said gas generant, tensioning of the strap and mating of the perforated strap and the plurality of protrusions is thereby effected, resulting in an essentially simultaneous rotary advancement of the hub, the webbing reel shaft, and the webbing reel, thereby winding the reel and tensioning the seatbelt webbing thereon.

2. The pretensioner of claim 1 wherein said actuator is a one-piece cylindrical piston.

3. The pretensioner of claim 1 wherein said actuator contains a gas generant composition that upon ignition propels the actuator.

4. The pretensioner of claim 1 further comprising a resilient cylindrical liner within said second passage and extending up to the circumference of but not within the diameter of the first passage, for strengthening the first end of the second passage.

5. The pretensioner of claim 1 further comprising a gas generator for containment of the gas generant composition.

6. A pretensioner cooperating with a webbing reel shaft of a seatbelt retractor webbing reel, that upon activation pretensions seatbelt webbing associated therewith, the pretensioner comprising:

a housing having a first circular cylindrical passage volumetrically intersecting a second rectangular cylindrical passage, said passages formed perpendicular to each other, wherein said shaft extends through said first passage and said second passage has an open first end and a second end, the second passage extending across and past the diameter of the first passage;

a resilient cylindrical sleeve having a closed first end and an open second end, wherein the second end of the sleeve is fixed to and axially aligned with the first end of the second cylindrical passage;

a cylindrical hub fixed to said webbing reel shaft and contained within the first passage wherein said webbing reel shaft axially extends through said hub;

a plurality of protrusions integral to and circumferentially spaced about said hub;

a perforated strap comprising a first end fixed to said housing, a flat portion extending from said first end and across said second passage, a second flat portion arranged about a portion of said hub, and a second end freely extending from said second portion such that the hub rotates independent of said strap prior to pretensioner activation;

an actuator positioned within said circular cylindrical sleeve for acting upon the flat portion of the strap upon pretensioner activation;

a gas generant composition, ignitable to activate the pretensioner and release sufficient force to drive the actuator through said second passage; and an initiator fixed within the first end of said cylindrical sleeve for igniting said gas generant composition and closing the first end of the cylindrical sleeve, whereby upon receipt of a signal to the initiator, the gas generant composition is ignited to release sufficient force to drive the actuator through said cylindrical sleeve and through said second passage thereby tensioning the strap and mating the perforated strap and the plurality of protrusions, resulting in an essentially simultaneous rotary advancement of the hub, the webbing reel shaft, and the webbing reel, thereby winding the reel and tensioning the seatbelt webbing thereon.

7. A pretensioner cooperating with a webbing reel shaft of a seatbelt retractor webbing reel, that upon activation pretensions seatbelt webbing associated therewith, the pretensioner comprising:

a housing having a first circular cylindrical passage volumetrically intersecting a second rectangular cylindrical passage, said passages formed perpendicular to each other, wherein said webbing reel shaft extends through said first passage and said second passage has a first end and a second end, the second passage extending across and past the diameter of the first passage;

a cylindrical hub fixed to said webbing reel shaft and contained within the first passage wherein said webbing reel shaft axially extends through said hub;

a plurality of protrusions integral to and circumferentially spaced about said hub;

a perforated strap comprising a first end fixed to said housing, a flat portion extending from said first end and across said second passage, a second flat portion arranged about a portion of said hub, and a second end freely extending from said second flat portion such that the hub rotates independently of said strap prior to pretensioner activation;

an actuator positioned within the first end of said second passage for tensioning said strap upon pretensioner activation; and a means for activating the pretensioner and driving the actuator through the second passage;

whereby upon activation of the pretensioner, the strap is tensioned and the perforated strap and the plurality of protrusions are meshed, thereby resulting in an essentially simultaneous rotary advancement of the hub, the webbing reel shaft, and the webbing reel, thus winding the reel and tensioning the seatbelt webbing thereon.

8. A pretensioner cooperating with a webbing reel shaft of a seatbelt retractor webbing reel, that upon activation pretensions seatbelt webbing associated therewith, the pretensioner comprising:

a housing having a first circular cylindrical passage volumetrically intersecting a second rectangular cylindrical passage, said passages formed perpendicular to each other, wherein said webbing reel shaft extends through said first passage and said second passage has a first end and a second end, the second passage extending across and past the diameter of the first passage;

a cylindrical hub fixed to said webbing reel shaft and contained within the first passage wherein said webbing reel shaft axially extends through said hub;

a plurality of protrusions integral to and circumferentially spaced about said hub;

a perforated strap comprising a plurality of apertures in an amount at least corresponding to the plurality of protrusions, a first end fixed to said housing, a flat portion extending from said first end and across said second passage, a second flat portion arranged about a portion of said hub, and a second end freely extending from said second flat portion such that the hub rotates independently of said strap prior to pretensioner activation, wherein said plurality of apertures operatively engage said plurality of protrusions upon pretensioner activation;

an actuator positioned within the first end of said second passage for tensioning said strap upon pretensioner activation;

a gas generant composition that upon ignition combustively communicates with said actuator and releases sufficient force to drive the actuator through said second passage; and an initiator within said housing and ignitably communicating with said gas generant composition for igniting said gas generant composition, whereby upon ignition of said gas generant, the strap tightens about the hub and the plurality of apertures and the plurality of protrusions mate, resulting in an essentially simultaneous rotary advancement of the hub, the webbing reel shaft, and the webbing reel, and thereby winding the reel and tensioning the seatbelt webbing thereon.

9. A pretensioner cooperating with a webbing reel shaft of a seatbelt retractor webbing reel, for pretensioning seatbelt webbing associated therewith, the pretensioner comprising:

a housing having a first circular cylindrical passage and a second rectangular passage, wherein said webbing reel shaft longitudinally extends through said first passage and said second passage has a first end and a second end;

an annular circular cylindrical hub contained within the first passage wherein said webbing reel shaft axially extends through said hub;

a plurality of protrusions integral to and circumferentially spaced about said hub;

a perforated strap comprising a plurality of apertures in an amount at least corresponding to the plurality of protrusions, a first end fixed to said housing, a first flat portion extending from said first end and across said second passage, a second flat portion arranged about a circumferential portion of said hub, and a second end freely extending from said second flat portion such that the hub rotates independently of said strap prior to pretensioner activation, wherein said plurality of apertures operatively engage said plurality of protrusions upon pretensioner activation;

an actuator positioned within the first end of said second passage for tensioning said strap upon pretensioner activation;

a gas generant composition that upon ignition combustively communicates with said actuator and releases sufficient force to drive the actuator through said second passage; and an initiator within said housing and ignitably communicating with said gas generant composition for igniting said gas generant composition, whereby upon ignition of said gas generant composition, the perforated strap translates linear motion of the actuator to rotary movement of the hub and thus pretensions the seatbelt in rotary communication with said hub.

10. A pretensioner cooperating with a webbing reel shaft of a seatbelt retractor webbing reel, for pretensioning seatbelt webbing associated therewith, the pretensioner comprising:

a housing having a first circular cylindrical passage and a second rectangular passage, wherein said webbing reel shaft longitudinally extends through said first passage and said second passage has a first end and a second end;

an annular circular cylindrical hub contained within the first passage wherein said webbing reel shaft axially extends through said hub;

a plurality of protrusions integral to and circumferentially spaced about said hub;

a perforated strap comprising a plurality of apertures in an amount at least corresponding to the plurality of protrusions, a first end fixed to said housing, a first flat portion extending from said first end and across said second passage, a second flat portion arranged about a circumferential portion of said hub, and a second end freely extending from said second flat portion such that the hub rotates independently of said strap prior to pretensioner activation, wherein said plurality of apertures operatively engage said plurality of protrusions upon pretensioner activation;

an actuator positioned within the first end of said second passage for tensioning said strap upon pretensioner activation; and a means for activating the pretensioner and driving the actuator through the second passage;

whereby upon activation of the pretensioner, the perforated strap translates linear motion of the actuator to rotary movement of the hub and thus pretensions the seatbelt in rotary communication with said hub.

11. A pretensioner cooperating with a webbing reel shaft of a seatbelt retractor webbing reel, for pretensioning seatbelt webbing associated therewith, the pretensioner comprising:

a housing having a first circular cylindrical passage and a second rectangular passage, wherein said webbing reel shaft longitudinally extends through said first passage and said second passage has a first end and a second end;

an annular circular cylindrical hub contained within the first passage wherein said webbing reel shaft axially extends through said hub;

a plurality of protrusions integral to and circumferentially spaced about said hub;

a perforated strap comprising a plurality of apertures in an amount at least corresponding to the plurality of protrusions, a first end fixed to said housing, a first flat portion extending from said first end and across said second passage, a second flat portion arranged about a circumferential portion of said hub, and a second end freely extending from said second flat portion such that the hub rotates independently of said strap prior to pretensioner activation, wherein said plurality of apertures operatively engage said plurality of protrusions upon pretensioner activation;

an actuator positioned within the first end of said second passage and biased against said first flat strap portion for tensioning said strap upon pretensioner activation; and a means for activating the pretensioner and driving the actuator through the second passage;

whereby upon activation of the pretensioner, the perforated strap translates linear motion of the actuator to rotary movement of the hub and thus pretensions the seatbelt in rotary communication with said hub.

* * * * *